US007040204B2

(12) United States Patent
Mikkelsen et al.

(10) Patent No.: US 7,040,204 B2
(45) Date of Patent: May 9, 2006

(54) METHOD FOR PREPARING GRAPHICS ON SHEETS

(75) Inventors: Steen Mikkelsen, Delavan, WI (US); Peter Alsten, Racine, WI (US); Geo Andersen, Aabyhoej (DK); David G. Jansson, Racine, WI (US)

(73) Assignee: Mikkelsen Graphic Engineering, Lake Geneva, WI (US)

( * ) Notice: Subject to any disclaimer, the term of this patent is extended or adjusted under 35 U.S.C. 154(b) by 232 days.

(21) Appl. No.: 10/283,460

(22) Filed: Oct. 30, 2002

(65) Prior Publication Data

US 2004/0083862 A1 May 6, 2004

(51) Int. Cl.
*B26D 5/00* (2006.01)
*G05B 15/00* (2006.01)

(52) U.S. Cl. ........................ 83/13; 83/34; 83/39; 83/75; 83/76.8; 83/365; 83/368; 83/371; 700/134; 700/150; 700/167; 700/259; 347/157

(58) Field of Classification Search .................... 83/13, 83/22, 32, 34, 39, 49, 52, 56, 371, 747, 72–75, 83/901, 75.5, 76.9, 76.8, 368, 364–366, 936–941; 101/3.1, 17, 19, 26, 32, 73, 45, 483, 486; 700/134, 171, 114, 213, 167, 150, 230, 135, 700/259; 347/157, 111; 400/621; 382/111, 382/165

See application file for complete search history.

(56) References Cited

U.S. PATENT DOCUMENTS

| | | | | |
|---|---|---|---|---|
| 3,805,650 | A * | 4/1974 | Pearl | 83/56 |
| 3,838,618 | A * | 10/1974 | Eissfeldt et al. | 83/34 |
| 4,721,058 | A * | 1/1988 | Hayamizu et al. | 118/665 |
| 4,901,359 | A * | 2/1990 | Bruder | 382/111 |
| 5,258,917 | A * | 11/1993 | Bruder et al. | 700/171 |
| 5,333,111 | A * | 7/1994 | Chaiken et al. | 700/135 |
| 6,619,167 | B1 * | 9/2003 | Mikkelsen et al. | 83/13 |
| 6,619,168 | B1 * | 9/2003 | Alsten et al. | 83/13 |
| 6,672,187 | B1 * | 1/2004 | Alsten et al. | 83/13 |
| 6,772,661 | B1 * | 8/2004 | Mikkelsen et al. | 83/13 |
| 6,797,103 | B1 * | 9/2004 | Mikkelsen et al. | 156/247 |

* cited by examiner

*Primary Examiner*—Stephen Choi
(74) *Attorney, Agent, or Firm*—Jansson, Shupe, Munger & Antaramian, Ltd.

(57) ABSTRACT

A method for preparing a graphic on a sheet of material which also includes at least one registration mark at and about the graphic in predetermined positions. The method involves the steps of applying the graphic and at least one registration mark on a sheet of material in positions according to layout data, transferring the layout data to a processing controller, placing the sheet of material on a sheet-receiving surface, sensing the position of the registration mark on the sheet of material, and utilizing the layout data and the position of the registration mark to precisely narrow-path-process around the graphic on the sheet of material. Certain embodiments use either (a) a subset of marks which is applied on one side of graphic or certain reference features, such as edges and corners of the sheet and elements of the graphic, to ascertain the position and orientation of the sheet on the apparatus.

16 Claims, 8 Drawing Sheets

METHOD FOR PREPARING GRAPHICS ON SHEETS

FIELD OF THE INVENTION

This invention is related generally to the field of cutting of graphics or the like from sheets for various purposes, and other narrow-path-processing about graphics on sheets.

BACKGROUND OF THE INVENTION

The technical field involving the cutting of graphic areas from sheets, or otherwise doing narrow-path-processing about graphics images on sheets, includes, for example, the face-cutting of laminate sheets to form decals. More specifically, a graphic on the face layer of a laminate needs to be cut away from the remainder of the face layer so that the graphic (decal) can subsequently be pulled away from the backing layer of the laminate and be applied elsewhere as intended. Highly accurate face-layer cutting about the graphics is obviously highly desirable.

This is but one example in which highly accurate sheet cutting is desirable. In many other situations, highly accurate sheet cutting may not involve face-cutting, but through-cutting, in which the full thickness of the sheet is cut about a graphic on the sheet. And in many situations, rather than highly accurate cutting, highly accurate scoring, creasing, line embossing or the like, in each case, of course, along a line the varying direction of which is determined by the shape of the graphic. Together these types of operations on sheets with respect to graphics thereon are referred to herein as "narrow-path-processing." For convenience, the prior art problems and the invention herein which solves such problems will be discussed primarily with reference to sheet-cutting apparatus.

A method and associated apparatus which address many of the problems encountered in such processing of sheet material is the i-cut® vision cuffing system from Mikkelsen Graphic Engineering of Lake Geneva, Wis., and are the subject of a pending U.S. Pat. No. 6,772,661. The invention described in such document is a method and apparatus for achieving highly improved accuracy in cutting around graphics in order to fuiiy adjust for two-dimensional distortion in the sheets from which the graphics will be cut, including distortion of differing degrees in one dimension or along one direction on the sheet of material. The distortion may be from the printing process or from some other post-printing process such as material handling or during the cuffing process itself. This invention also provides improved speed and accuracy in narrow-path-processing and greater efficiency of material usage.

In some cases, such as in the i-cut™ system from Mikkelsen Graphic Engineering, a flatbed plotter is used. These are devices having a positionally-controlled cutting implement above a flat work surface on which the sheet to be cut rests. The cutting implements are controlled based on controller-supplied instructions based on the X-Y coordinates necessary to achieve cutting along the intended path, such as about the graphic.

Achieving greater speed and overall efficiencies in narrow-path-processing is a continuing challenge encountered with such systems. One source of inefficiency is the manual intervention often required to adjust the initial position and alignment of the sheet on the work surface of the cutting apparatus. Sheets of material on which graphics have been previously printed are placed on the work surface of the cutting apparatus, either manually or by automatic sheet-feeding equipment. In either of these set-up situations, the cutting apparatus must determine the position and orientation of the sheet on the work surface in order to proceed accurately with the cutting process. If the operator or automatic sheet-feeder places the sheet of material on the work surface such that it is outside of the area or region of alignment on the work surface which the cutting system expects to find the sheet, manual intervention may be necessary to adjust the placement of the sheet to within the required initial region in order for the process to continue beyond this initial set-up step. Another source of inefficiency is the time-consuming step which may be required to allow the system to determine the initial position and orientation of the sheet on the work surface.

Another source of inefficiency is the requirement that information pertaining to a specific graphic be created and entered into the processing controller. Such information may require additional scanning of each sheet of material on which graphics are applied or otherwise inputting data concerning X-Y positions, angle orientations, scale factors, types or shapes of marks, graphic boundaries, etc.

Another measure of efficiency is the amount of material waste which is produced during narrow-path-processing. Depending on volumes of material processed and the cost of the material used, the amount of waste may be important to minimize in order to increase overall process efficiency.

Despite the significant advances represented by the i-cut™ system, these advances have not yet achieved the highest levels of performance which potentially can be reached by automated cutting systems. Further increases in efficiency (precision, speed and efficiency of operation, and material usage) are highly desirable in automated cutting systems.

OBJECTS OF THE INVENTION

It is an object of this invention to provide an improved method for precision preparation of graphics from sheets and other narrow-path-processing with respect to graphics on sheet materials of various kinds, thereby overcoming some of the problems and shortcomings of the prior art.

Another object of this invention is to provide a method for reducing the time to recognize a specific graphic or sheet of material and identify processing information pertaining to the graphic and/or sheet.

Another object of the invention is to minimize or completely eliminate the need for manual intervention by an operator in the inputting of layout information related to specific graphics or sheets of material.

Another object of this invention is to provide an improved method which increases the speed of preparing processes graphics on sheets of material.

Another object of this invention is to provide an improved method which automate the cutting and other narrow-path-processing of sheet material as much as possible.

Another object of this invention is to provide an improved method which reduces material waste in cutting and other narrow-path-processing of sheet material.

Another object of the invention is to provide a improved method which provides for automatic determination of sheet position and orientation of for processing around graphics on the sheet in order to fully adjust for two-dimensional distortion in the sheets from which the graphics will be processed.

These and other objects of the invention will be apparent from the following descriptions and from the drawings.

SUMMARY OF THE INVENTION

The instant invention overcomes the above-noted problems and shortcomings and satisfies the objects of the invention. The invention is an improved method automatically preparing graphics on a sheet of material. Stated more broadly, the invention is an improved method and apparatus for narrow-path-processing with respect to graphics images on sheets, including by cutting, creasing, scoring or the like around such images. Of particular note is that the instant invention brings high speed and improved efficiency, including minimizing material waste and eliminating certain manual intervention, to the precision processing of graphics images from sheets bearing such images, including without limitation in situations in which there has been distortion of various kinds in the sheets, including two-dimensional distortion.

The method of this invention, stated with respect to automatically preparing graphics from sheets of material including such graphics, includes as a first step applying a graphic and at least one registration mark on a sheet of material in positions according to layout data. The registration mark is preferably applied at and about the graphic in known predetermined positions with respect to the graphic, or more particularly, with respect to the perimeter thereof which will be processed. In certain preferred embodiments at least one registration mark is provided within the graphic. In other certain preferred embodiments, at least one registration mark is in an initial-position/orientation-determining subset which is located on no more than one side of the graphic.

As used herein, the word "perimeter" means the intended processing path around a graphic, whether or not the intended processing path is an outer edge of the graphic or an inner edge (such as from removal of the inside of the letter "D").

The method involves: transferring the layout data to a processing controller; placing the sheet of material on a sheet-receiving surface; sensing the position of the registration mark on the sheet of material; and utilizing the layout data and the position of the registration mark to precisely process or cut around the graphic on the sheet of material. The transfer of layout data to the processing controller may be performed by downloading the data from the graphic and mark application device to a disc and uploading the data to the controller, through a network connection between the application device and the controller or otherwise. This method allows the identification of the graphic and/or sheet and the retrieval of the respective layout data to occur rapidly with a minimum of manual intervention and processing to occur precisely even if two-dimensional distortion of the sheet has occurred prior to processing.

It is highly preferred that the controller furnish instructions for the sensing and processing operations so that the determinations involving sensing and processing are carried out swiftly and on a continuing basis as one or more graphics are processed from a sheet and as additional sheets are processed. The controller further facilitates the efficiency improvements of this invention.

In preferred embodiments the registration marks may be multiple lines applied along an edge of the sheet of material, multiple marks applied along an edge of the sheet of material, multiple marks applied on the sheet of material surrounding the graphic, or a bar code. If a bar code, the method preferably includes the further steps of: reading the bar code to identify the sheet of material on the sheet-receiving surface; and finding the layout data corresponding to the graphic and registration mark applied on the sheet of material. It is preferred that the bar code simply identify the proper file associated with the sheet or graphic. Therefore, because the bar code need only communicate a file name or file number, it can be quite small.

In other preferred embodiments, the layout data comprises graphic data and registration mark data. In such embodiments, the method preferably further includes the steps of downloading the graphic data and registration mark data to at least one file, transferring the file or files to the processing controller; and uploading the graphic data and registration mark data from the file or files to the processing controller. The registration mark data may include data pertaining to X-Y position, angle orientation, scale factor, and/or mirroring information. The graphic data may including nesting information (i.e., the optimized spacing of multiple graphics at various positions on the sheet), mirroring information related to mirrored graphics, contour information, perimeter information, X-Y position, angle orientation, and/or scale factor.

A preferred method further includes the steps of: after placing the sheet of material on the sheet-receiving surface, sensing the registration mark in a field of view of a main sensor and utilizing the layout data to determine a position and orientation of the sheet of material; if the registration mark is not in an expected location, automatically determining a coordinate region of the registration mark on the sheet-receiving surface by enlarging the field of view of the main sensor and locating the coordinate region of the registration mark within the enlarged field of view; in response to determining the coordinate region of the registration mark, automatically repositioning the main sensor to the coordinate region by shrinking the field of view of the main sensor such that the registration mark is within the field of view of the main sensor; and utilizing the layout data and the position of the registration mark to precisely process around the graphic on the sheet of material.

In another preferred method, the sensing step includes moving a sensor operatively connected to the sheet-receiving surface along the surface to detect the position of the registration mark and the utilizing step includes communicating the position of the registration mark from the sensor to the processing controller.

In another description of the invention, the method for automatically preparing at least one graphic on a sheet of material comprises: applying the graphic on the sheet of material in a position according to layout data, the layout data including a predetermined approximate position and orientation of the graphic with respect to a set of reference features of the sheet of material; transferring the layout data to a processing controller; placing the sheet of material on a sheet-receiving surface; automatically determining whether the reference features are in an expected coordinate region on the sheet-receiving surface; if the reference features of the sheet of material are not in the expected coordinate region, automatically determining the coordinate region of the reference features on the sheet-receiving surface; sensing metrics of the reference features to determine a position and orientation of the sheet of material; inferring therefrom the approximate position of the graphic; and utilizing the layout data and precise position of the graphic to precisely process around the graphic on the sheet of material. Transfer of the layout data to the processing controller may be through a network connection, by downloading the layout data to a disc and uploading the layout data from the disc to the processing controller, or by other means.

In another description of the invention, the method comprises the steps of: applying the graphic on the sheet of material in a position according to layout data; applying a plurality of registration marks on the sheet of material at and about the graphic in predetermined positions with respect thereto at the time the graphic is applied according to layout data, the plurality of registration marks including an initial-position/orientation-determining subset located on no more than one side of the graphic; transferring the layout data to a processing controller; placing the sheet of material on a sheet-receiving surface; sensing the subset to ascertain a position and orientation of the sheet of material and approximate positions of the plurality of registration marks thereon; sensing precise positions of the registration marks on the sheet of material; and utilizing the layout data and the precise positions of the registration marks with respect to the graphic to precisely process around the graphic on the sheet of material.

Such a method may also include the steps of retaining the sheet of material on the sheet-receiving surface at a location thereon such the sheet of material overlaps the X and Y coordinate grid, acquiring X and Y coordinates which are overlapped by the registration marks and comparing the X and Y coordinates which are overlapped by the registration marks with a reference set of X and Y coordinates.

In certain preferred embodiments the layout data includes reference X and Y coordinates for the registration marks and the predetermined positions thereof with respect to the perimeter of the graphic when the graphic and registration marks are applied to the sheet of material and the utilizing step further includes setting an optimized processing path based on the comparing step, such optimized processing path corresponding to the perimeter of the graphic.

In another description, the invention represents an improvement on methods for preparing graphics on a sheet of material which include the steps of: applying the graphic and at least one registration mark on the sheet of material, placing the sheet on a sheet-receiving surface, sensing positions of the registration marks and utilizing the positions of the registration marks to process around the graphic on the sheet of material. The improvement wherein a processing controller utilizes processing data to process around the graphic on the sheet of material and comprising the steps of creating and using layout data to apply the graphic and registration marks to the sheet of material; transferring the layout data to the processing controller; identifying the sheet placed on the sheet-receiving surface; locating the layout data which pertains to the identified sheet; and utilizing the layout data as the processing data. This improved method allows the processing to occur efficiently and rapidly with a minimum of manual intervention and to occur precisely despite two-dimensional distortion of the sheet prior to processing.

In preferred embodiments of the invention, the initial-position/orientation-determining subset is a pair of registration marks in tandem relationship to each other. The term "tandem relationship" as used herein means spaced closer to one another than the average spacing between other registration marks applied on the sheet of material. For example, on a sheet of material one meter by one meter in size with graphics applied including registration marks around the perimeters of the graphics, two registration marks applied near one corner of the sheet with a 25 mm space between the centers of the two marks are said to be in tandem relationship with each other.

In certain preferred embodiments, each of the registration marks of the pair is a round area, and the sensing step includes processing sensed data to find the mathematical centers thereof Further, in highly preferred embodiments, all of the registration marks are round areas, and the sensing step includes processing sensed data to find the mathematical centers thereof.

In highly preferred embodiments, the method includes the additional step of placing the sheet on a sheet-receiving surface having an X and Y coordinate grid and retaining the sheet at a user-selected location thereon such that the sheet of material overlaps the X and Y coordinate grid. In such preferred embodiments, the sensing of the precise positions of the registration marks on the sheet includes the step of acquiring the X and Y coordinates which are overlapped by the registration marks. Further, preferred embodiments of the invention include in the processing process the step of comparing the X and Y coordinates which are overlapped by the registration marks with a reference set of X and Y coordinates. In highly preferred embodiments, the comparing step is carried out by the controller.

In certain preferred embodiments, the controller has a programmed set of predetermined processing instructions which includes reference X and Y coordinates for the registration marks and also includes the predetermined positions thereof with respect to the perimeter of the graphic when the graphic and registration marks are first applied to the sheet. Such processing instructions are preferably delivered to the controller as layout data from the graphic and registration mark application. In such embodiments, the processing step includes setting a final (optimized) processing path based on the comparing step, such final processing path corresponding to the perimeter of the graphic of the sheet even though such perimeter is distorted during the uncut life of the sheet.

In certain preferred embodiments, the sheet is a laminate having (a) a face layer which bears one or more graphics and registration marks corresponding to each, and (b) a backing layer, and the processing is face cutting only. This allows preparation of highly accurate decals, which can later be removed from the backing layer.

In many cases, depending on the size of the sheet, it is preferred that there be a plurality of graphics on each sheet and a corresponding plurality of sets of the registration marks at or about each graphic.

In a highly preferred embodiment of the invention, the method involves: placing the sheet on a sheet-receiving surface; sensing the subset in the field of view of a main sensor to ascertain the position and orientation of the sheet and to infer the approximate positions of the plurality of marks; if the subset is not in an expected location, automatically determining the coordinate region of the subset on the sheet-receiving surface; sensing the precise positions of the marks; and processing the graphic from the sheet in response to the precise positions of the marks with respect to the graphic. This embodiment of the method allows the sensing of the registration marks to occur rapidly with a minimum of manual intervention and cutting (or other narrow-path-processing) to occur precisely, whether or not two-dimensional distortion of the sheet is present prior to processing.

In certain preferred embodiments of the invention, automatically determining the coordinate region of the subset includes moving the main sensor in a predetermined pattern surrounding the expected location of the subset and stopping the movement of the main sensor when the coordinate region of the subset is located within the field of view of the main sensor. In one such embodiment, movement of the main sensor is in the plane of the sheet-receiving surface. In another such embodiment, moving the main sensor includes rotating the main sensor such that the field of view changes.

In certain embodiments of the invention, the automatic determining step includes enlarging the field of view of the main sensor, thereby locating the coordinate region of the subset within an enlarged field of view. The main sensor is then repositioned, including shrinking the field of view of the main sensor, such that the subset is within the field of view of the main sensor. In one such embodiment, enlarging and shrinking the field of view of the main sensor is performed by zooming a lens of the main sensor. In another such embodiment, the enlarging and shrinking steps are performed by increasing and decreasing respectively the distance between the main sensor and the sheet-receiving surface.

In another embodiment of the invention, automatically determining the location of the coordinate region of the subset involves locating the coordinate region of the subset within the field of view of a secondary sensor.

In certain embodiments of the invention, automatic determination the coordinate region of the subset includes sensing directive indicia on the sheet of material which indicate the coordinate region of the subset, the directive indicia being extra marks printed on the sheet of material outside the coordinate region of the subset. In particular embodiments of the invention, the automatic determining step includes determining from the directive indicia the direction and distance from the expected location to the actual location and repositioning the main sensor by moving it in the determined direction for the determined distance.

Another aspect of the inventive technology disclosed herein involves an alternative approach to ascertaining the position and orientation of the sheet of material. The method involves: placing the sheet on a sheet-receiving surface; sensing a set of reference features of the sheet of material (such as edges, a corner, or elements of a graphic printed on the sheet) in the field of view of a main sensor to ascertain the position and orientation of the sheet and to infer the approximate positions of the plurality of marks; if the reference features are not in an expected location, automatically determining the coordinate region of the reference features on the sheet-receiving surface and then sensing the metrics of the reference features in order to then ascertain such position and orientation and infer such approximate positions; sensing the precise positions of the marks; and processing the graphic from the sheet in response to the precise positions of the marks with respect to the graphic.

The coordinate region of the set of reference features on the sheet-receiving surface is the area thereof which, when contained within the field of view of the main sensor, enables main-sensor sensing of the set with precision sufficient to determine the position and orientation of the sheet of material on the sheet-receiving surface such that the various registration marks can be automatically found to enable subsequent precision sensing thereof.

As used herein, the term "metrics," applied in characterizing a reference feature, refers to the numerical parameters which can be used by the device to describe the position and orientation of the reference feature and, in combination with other metrics of this and other reference features, can be used to ascertain the position and orientation of the sheet of material on the sheet-receiving surface. For example, a straight edge of a sheet of material defines a line which lies at an angle with respect to the coordinate system axes of the sheet-receiving surface. Such angle is one such "metric." The corner of a sheet defined by the intersection of two such edges defines a point within the coordinate system, and the x,y coordinates of the comer point are two more such "metrics." Other metrics might include, among other things, certain geometric descriptors of shapes, positions, and orientations of graphical images within the graphic itself.

In a fashion similar to embodiments wherein a subset of initial-position/orientation-determining marks is employed, other embodiments of the inventive technology include the alternative use of a set of reference features.

The apparatus of this invention is a device for processing a graphic at the perimeter thereof from a sheet of material, the sheet having a plurality of registration marks at and about the graphic, the plurality of registration marks including an initial-position/orientation-determining subset that is located on no more than one side of the graphic. The registration marks are simply added during the printing of the graphic.

The inventive apparatus includes: a sheet-receiving surface; a main sensor, preferably a CCD area image sensor; for sensing the subset in the field of view of the main sensor to ascertain the position and orientation of the sheet and to infer approximate positions of the plurality of marks and for sensing the precise positions of the marks; a cutter or other processing device operatively connected to the main sensor and movable about the sheet-receiving surface, the cutter processing the graphic from the sheet of material in response to the precise positions of the registration marks sensed by the main sensor; and a controller for controlling movement of the cutter along the sheet-receiving, the controller including a set of initialization instructions corresponding to (a) predetermined approximate positions of the initial-position/orientation-determining subset on the sheet and (b) the relative positions of the remaining registration marks thereon with respect to the position of the subset. The invention, as already indicated, allows the sensing of the registration marks to occur rapidly and processing to occur precisely despite two-dimensional distortion of the sheet prior to processing.

In preferred embodiments, the initialization instructions of the controller also include instructions for sensing the precise position and orientation of the subset, whereby the approximate positions of the remaining registration marks are inferred to facilitate sensing of the precise positions of the remaining registration marks. Further, the controller includes a set of predetermined processing instructions therein corresponding to the perimeter of the graphic and the predetermined position thereof with respect to predetermined positions of the registration marks when the graphic and registration marks are first applied to the sheet, the controller moving the cutter along the sheet-receiving surface in response to a comparison of (a) the locations of the registration marks sensed by the sensor on the sheet with (b) the set of predetermined processing instructions.

In highly preferred embodiments of the invention, the apparatus also includes a coordinate region locator which, if the subset is not in an expected location, automatically determines the coordinate region of the subset on the sheet-receiving surface and in response thereto automatically repositions the main sensor to the coordinate region such that the subset is within the field of view of the main sensor.

In other highly preferred embodiments of the invention, the coordinate region locator includes a controller with a set of locating instructions for moving the main sensor in a predetermined pattern surrounding the expected location of the subset, and stopping the movement of the main sensor when the coordinate region of the subset is located within the field of view of the main sensor.

In certain preferred embodiments, the coordinate region locator includes a zoom lens on the main sensor and a controller with a set of locating instructions for (a) enlarging the field of view of the main sensor by zooming the lens, (b) locating the coordinate region of the subset within the enlarged field of view, (c) repositioning the main sensor in response to the locating step, and (d) shrinking the field of view of the main sensor by zooming the lens such that the subset is within the field of view of the main sensor.

Another embodiment of the coordinate region locator includes a main-sensor height adjustor and a controller with a set of locating instructions for (a) enlarging the field of view of the main sensor by increasing the distance of the main sensor from the sheet material, (b) locating the coordinate region of the subset within the enlarged field of view, (c) repositioning the main sensor in response to the locating step, and (d) shrinking the field of view of the main sensor by decreasing the distance of the main sensor from the sheet such that the subset is within the field of view of the main sensor.

In certain embodiments of the invention, the coordinate region locator includes a secondary sensor with a field of view larger than the field of view of the main sensor, and a controller with a set of locating instructions for (a) locating the coordinate region of the subset within the field of view of the secondary sensor, and (b) repositioning the main sensor in response to the locating step such that the subset is within the field of view of the main sensor.

In another embodiment of the invention, the coordinate region locator includes directive indicia printed on the sheet of material outside the coordinate region of the subset in predetermined positions and orientations with respect to the subset, and a controller with a set of locating instructions for determining the coordinate region of the subset by sensing the directive indicia, and repositioning the main sensor in response thereto, such that the subset is within the field of view of the main sensor.

Another aspect of the inventive apparatus disclosed herein involves an alternative approach to ascertaining the position and orientation of the sheet of material. In some highly preferred embodiments, the apparatus also includes a reference feature identifier which, if the reference features are not in an expected coordinate region on the sheet-receiving surface, automatically determines the coordinate region of the reference features, and which, when the coordinate region of the reference features is known, senses the metrics of the reference features in order to infer the approximate positions of the registration marks.

In a fashion similar to embodiments in which a subset of initial-position/orientation-determining marks is employed, other embodiments of the inventive apparatus include the alternative use of a set of reference features.

DETAILED DESCRIPTION OF PREFERRED EMBODIMENTS

Figure 1:
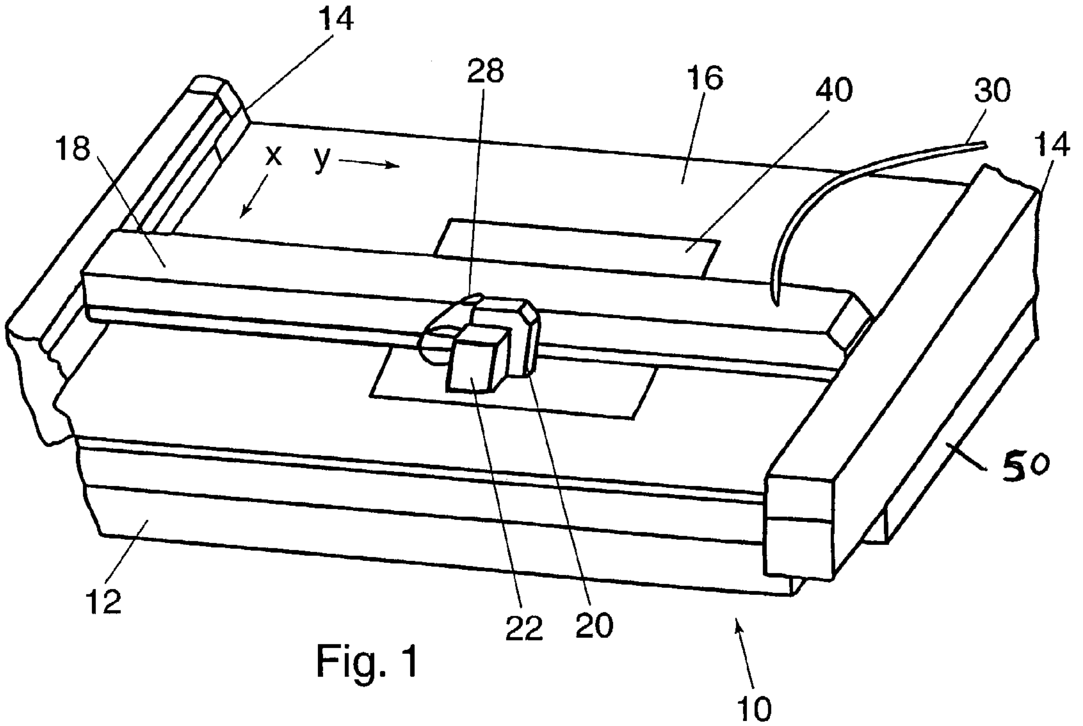
FIG. 1 is a perspective view of an automatically controlled processing apparatus employing the present invention.

Referring to FIG. 1, a partially cut away view of a cutting or processing device 10 is shown. Cutting device 10 has a housing 12 which may contain the controller 50 and a sheet-receiving surface 16. Cutting device 10, which is shown with a sheet 40 positioned on sheet-receiving surface 16, is also known as a flatbed plotter or cutter in the art and may be a Zund plotter, manufactured by Zund System Technik HG, or a Wild plotter, to give two examples.

Cutting device 10 includes two longitudinal guide rails 14 mounted on housing 12 and a transverse member 18 is suspended between longitudinal guide rails 14. Transverse member 18 is driven by a motor (not shown) along guide rails 14. A cutting tool 20 rides on transverse member 18. Cutting tool 20 has a cutting knife (not shown).

A main sensor 22 is shown attached to cutting tool 20. While sensor or detector 22 is shown attached to cutting tool 10, it is not necessary for it to be attached to it. Main sensor 22 may be an optical detector responsive to registration marks on sheet 40.

Cutting tool 20 moves along transverse member 18 and is driven by a motor (not shown). Cutting tool 20 is capable of moving laterally or longitudinally along work surface 16. Cutting tool 20 may have pressure and tangential controlled tungsten carbide blades, tungsten carbide blades, other blades that are generally known or lasers, which are not shown. The cutter driver (not shown) which controls cutting tool 20 is standard and is known in the art.

Figure 2:
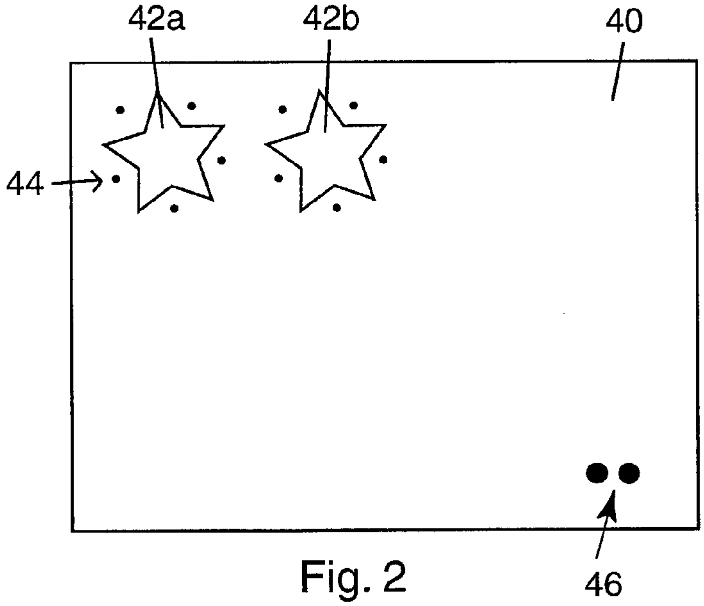
FIG. 2 is a top view of a sheet of sheet material with pre-printed graphics and registration marks, including an initial-position/orientation-determining subset of marks.

Referring to FIG. 2, registration marks 44 are pre-printed on sheet 40. Sheet 40 has many registration marks 44 preprinted thereon, including several around each of the graphics 42*a* and 42*b* which are intended to be processed from sheet 40. (A variety of shapes, sizes, and colors for the marks are possible. In some embodiments, registration marks are circles, either filled or unfilled, of equal size. They may be anywhere from 3 mm to 12 mm in diameter, with a preferred outer diameter of 6.3 mm.) Registration marks 44 are adjacent to, but not contiguous with, the perimeters of preprinted graphics 42*a* and 42*b*.

The registration marks include an initial-position/orientation-determining subset 46 of marks which is on only one side of the graphics 42*a* and 42*b*. This subset 46 is placed only to one side of graphics 42*a* and 42*b* to facilitate rapid determination of the positions of subset 46 relative to work surface 16. It is possible for there to be more than one subset of unique initial-position/orientation-determining marks, but in such cases only one such subset need be sensed.

Main sensor 22 is connected to the input of the controller, part of the coordinate region locator (not shown as a discrete element) by cables 28 and 30. The controller is also connected to and drives cutting tool 20. The controller receives the input external data and compares it to the format and content of information which it has stored in it. For each graphic 42*a* and 42*b*, the information stored in the controller is the location of the perimeter of the graphic relative to the locations of registration marks 44 as printed on sheet 40. Specifically, the controller has information defining the position of the registration marks 44 and the intended processing paths, information defining the position of the registration marks 44 with respect to initial-position/orientation-determining subset 46 of marks, and information defining the expected location of subset 46 on sheet-receiving surface 16.

After graphics 42*a* and 42*b* and registration marks 44 and initial-position/orientation-determining subset 46 of marks have been printed on sheet 40, sheet 40 is placed on sheet-receiving surface 16 at an initial position and orientation. When the controller instructs main sensor 22 to sense subset 46 but subset 46 is not found in the location expected by the controller, the controller instructs main sensor 22 to move in a predetermined pattern in order to determine the coordinate region of subset 46.

The controller instructs sensor 22 to find the precise positions of the mathematical centers of initial-position/orientation-determining subset of marks 46 and defines these positions in X-Y coordinates of work surface 16. This information is then used to determine the position and orientation of sheet 40 on work surface 16. Once the position and orientation of sheet 40 are known, the controller uses the stored information on the relative location of registration marks 44, in conjunction with sensors 22, to determine the precise positions of registration marks 44.

The controller compares the actual distance between the three registration marks (44) which are closest to a point on the intended processing point, and adjusts the processing path according to the changes between these registration marks using the information for their locations when printed on sheet 40. The adjustments are made by making changes in the X-Y coordinates of points along the processing path.

The sensor or detector 22 may be a CCD camera, which is known in the art. The cutter drivers (not shown) are also known in the art. In operation, sensor 22 is caused to be positioned over a registration mark 44. Sensor 22 finds the mathematical center of a registration mark 44 and defines its position in X-Y coordinates of work surface 16. Two other registration marks 44 are located and their centers are defined by X-Y coordinates in like manner.

These data are inputted to the processing controller where the actual locations of registration marks 44 on ready-to-be-cut sheet 40 are compared to those of the registration marks in the predetermined processing instructions. The predetermined processing path which is a collection of X-Y coordinate sets is adjusted according to the actual X-Y coordinates of registration marks 44. These comparisons are made interactively throughout the cutting process, making the process a dynamic process.

The processing path is adjusted according to the actual coordinates of the three registration marks 44 closest to a processing point. When the processing of an individual graphic is completed, cutting tool 20 is caused to be lifted and moved to the next graphic and the process is repeated.

In the operating mode, sheet material 40 is placed on work surface 16 and may be held in place by a vacuum which acts through the work surface. The processing of graphics 42*a* and 42*b* is effected by movement of computer-controlled cutting tool 20 and computer-controlled transverse rail 18. The predetermined processing instructions contained in the controller are based upon the graphic which was originally printed on sheet 40. The processing path is defined in X-Y coordinates.

As already noted, sensor 22 finds the locations of registration marks 44 and defines them in X-Y coordinates. This information is compared to the predetermined X-Y coordinates of the registration marks, and the processing path along the perimeters of the graphics are adjusted according to the changes in the location of the three registration marks are closest to each processing point. The processing path is optimized and modified dynamically as the cutting proceeds; i.e., an appropriate final processing path is determined.

Figure 3A:
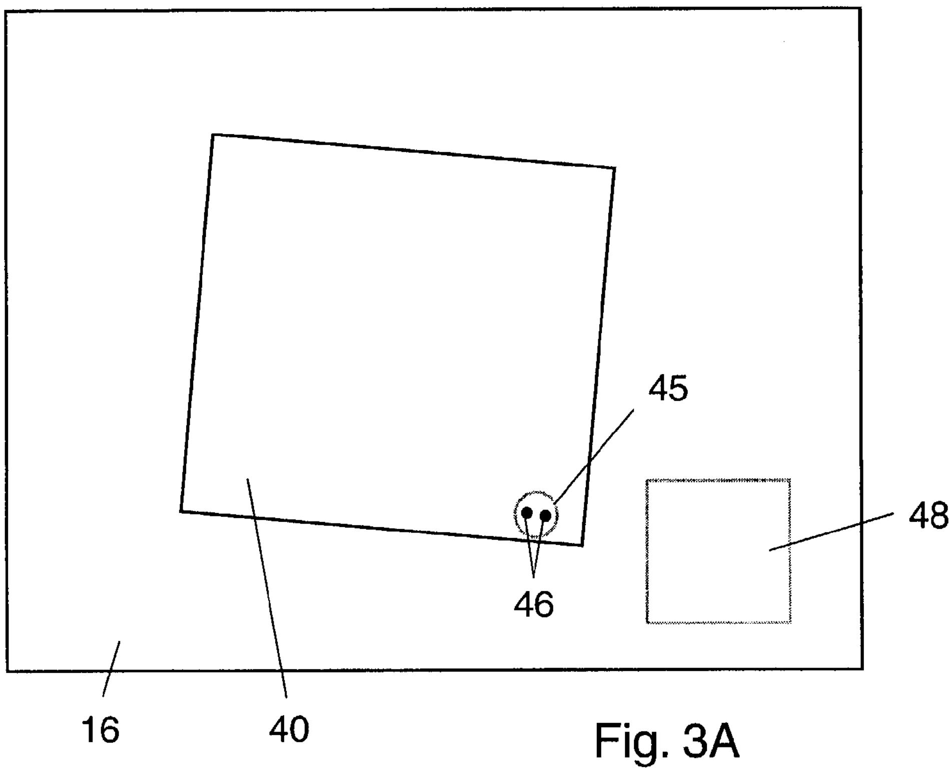
FIG. 3A is a top view of a sheet of material on a sheet-receiving surface, illustrating a coordinate region of the subset and a field of view of a main sensor which does not contain the coordinate region of the subset.

FIG. 3A illustrates sheet 40 placed on sheet-receiving surface 16 such that coordinate region 45 of subset 46 of marks is not within initial field of view 48 of main sensor 22. FIG. 3A illustrates this situation within the context of a coordinate region locator. In the following detailed descriptions, two approaches for ascertaining the position and orientation of sheet 40 are described in parallel fashion; one is a coordinate region locator and the other is a reference feature identifier. Either of these approaches can be used during the process of ascertaining the position and orientation of sheet 40. The coordinate region locator uses subset 46; the reference feature identifier uses a reference feature set (e.g., see set 49 in FIG. 3B). Such subset of registration marks and such reference feature set each, by itself, uniquely indicates such position and orientation.

Figure 3B:
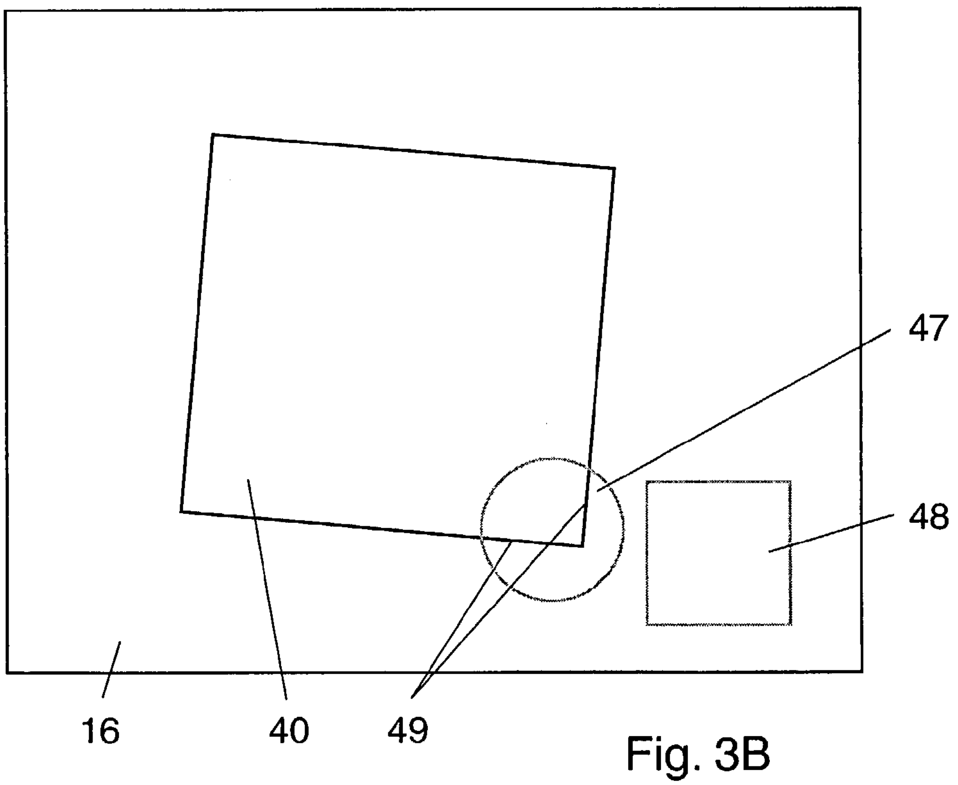
FIG. 3B is a top view of a sheet of material on a sheet-receiving surface, illustrating a coordinate region of a set of reference features and a field of view of a main sensor which does not contain the coordinate region of the set.

Thus, referring to FIG. 3B, within the context of a reference feature identifier, sheet 40 is shown placed on sheet-receiving surface 16. A reference feature set 49 (shown as two edges at one corner of sheet 40) is within coordinate region 47 of sheet-receiving surface 16, with region 47 not within initial field of view 48 of main sensor 22. Referring back to FIG. 1, main sensor 22 is connected to the input of the controller, part of the reference feature identifier (not shown as a discrete element) by cables 28 and 30. The controller is also connected to and drives cutting tool 20. The controller receives the input external data and compares it to the format and content of information which it has stored in it. For each graphic 42*a* and 42*b*, the information stored in the controller is the location of the perimeter of the graphic relative to the locations of registration marks 44 as printed on sheet 40. Specifically, the controller has information defining the position of the registration marks 44 and the intended processing paths, information defining the position of the registration marks 44 with respect to reference feature set 49, and information defining the expected location of set 49 on sheet-receiving surface 16.

After graphics 42*a* and 42*b* and registration marks 44 have been printed on sheet 40, sheet 40 is placed on sheet-receiving surface 16 at an initial position and orientation, illustrated in FIG. 3B . When the controller instructs main sensor 22 to identify set 49 but set 49 is not found in the location expected by the controller, the controller instructs main sensor 22 to move in a predetermined pattern. The location expected by the controller is represented by initial field of view 48 of main sensor 22.

Figure 4A:
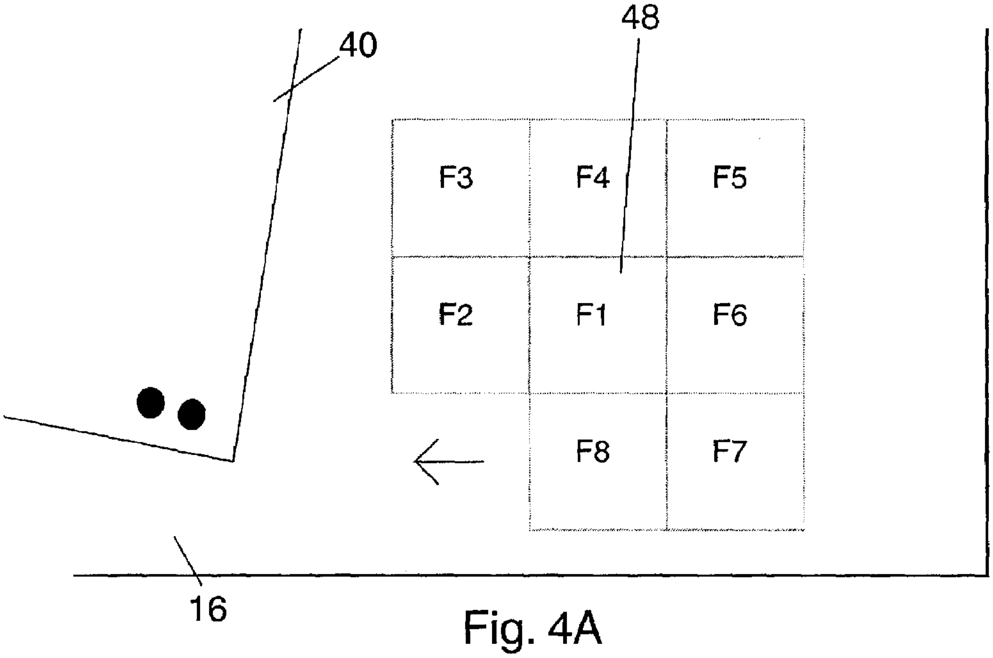
FIG. 4A is a top view of a portion of a sheet-receiving surface, a portion of a sheet of material, and one predetermined pattern of movement of the main sensor, illustrated by consecutive fields of view of the main sensor.
Figure 4B:
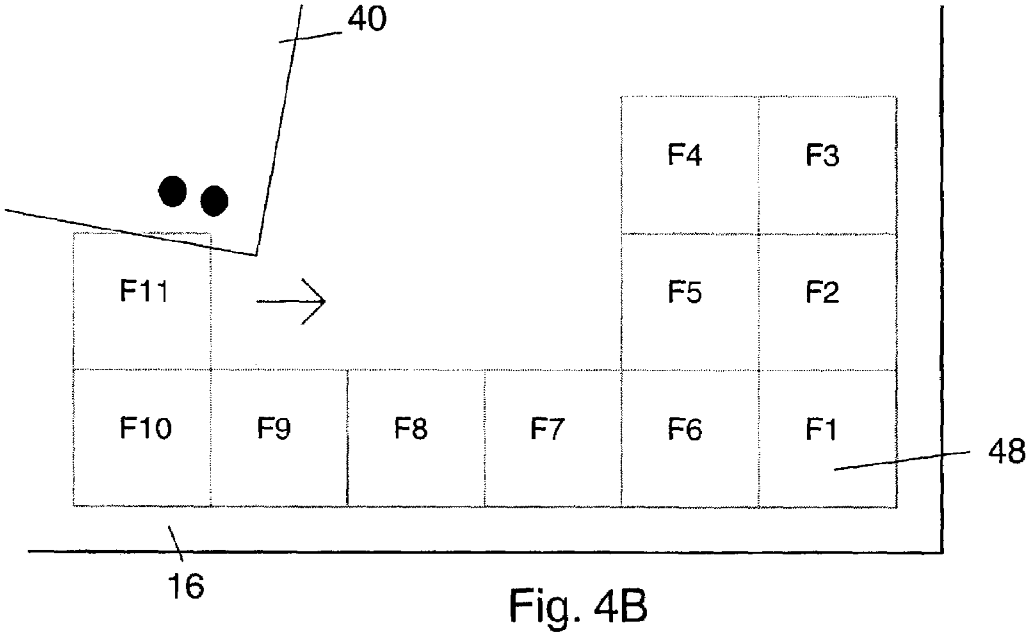
FIG. 4B is a top view of a portion of a sheet-receiving surface, a portion of a sheet of material, and a second predetermined pattern of movement of the main sensor, illustrated by consecutive fields of view of the main sensor.

FIGS. 4A and 4B illustrate two predetermined patterns along which main sensor 22 is directed to move by the set of instructions of the coordinate region locator. In FIG. 4A and 4B, one corner of sheet-receiving surface 16 is shown, along with one corner of sheet 40 containing subset 46. In both of these figures, movement of main sensor 22 is illustrated by consecutive fields of view F1, F2, F3 . . . , etc., with initial field of view 48 (F1) aligning with the expected location of subset 46. FIG. 4A illustrates a predetermined outwardly-expanding spiral pattern, and FIG. 4B illustrates a predetermined L-shaped pattern. These examples of predetermined patterns are but two of many patterns which can be used in the coordinate region locator to place coordinate region 45 of subset 46 within the field of view of main sensor 22.

Information obtained by sensing subset 46 is then used to determine the position and orientation of sheet 40 on work surface 16. Once the position and orientation of sheet 40 are known, the controller uses the stored information on the relative location of registration marks 44, in conjunction with main sensor 22, to determine the precise positions of registration marks 44.

In a manner similar to FIGS. 4A and 4B, FIGS. 4C and 4D illustrate the same two predetermined patterns along which main sensor 22 is directed to move, but in this case by the controller of a reference feature identifier. The metrics obtained by sensing set 49 are then used to determine the position and orientation of sheet 40 on work surface 16. Once the position and orientation of sheet 40 are known, the controller uses the stored information on the relative location of registration marks 44, in conjunction with main sensor 22, to determine the precise positions of registration marks 44.

While FIGS. 4A through 4D illustrate predetermined patterns made of a series of discrete fields of view, the patterns of this invention also contemplate continuous movement and continuous viewing by the coordinate region locator or the reference feature identifier.

Figure 5:
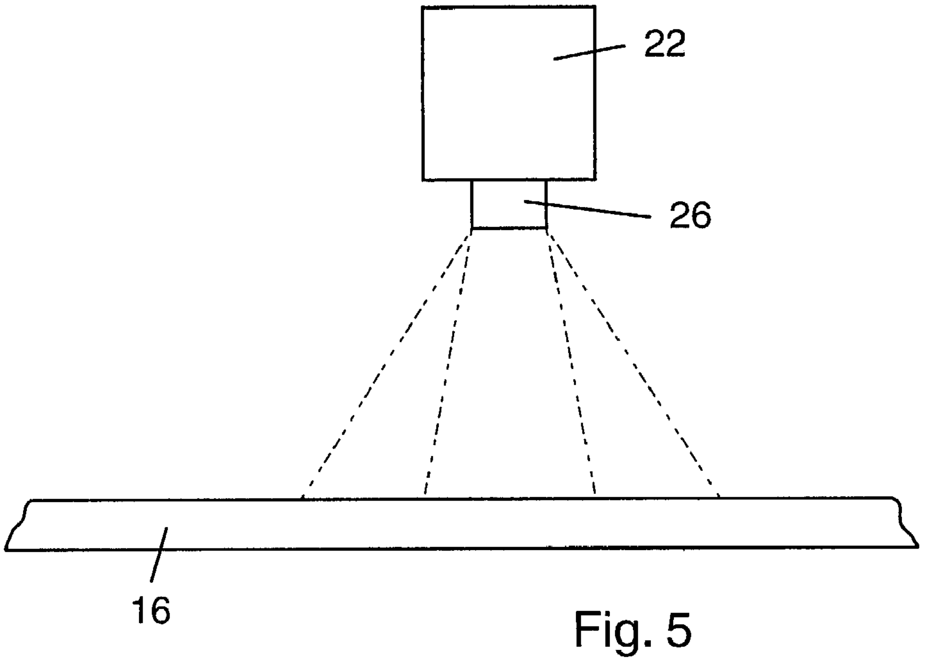
FIG. 5 is a schematic side view of sheet-receiving surface and a main sensor with a zoom lens.

FIG. 5 shows schematically another embodiment of the coordinate region locator. Main sensor 22 includes a zoom lens 26 which is used to enlarge the field of view of main sensor 22. When subset 46 is not in an expected location, the controller of the coordinate region locator instructs the zoom lens to zoom out to enlarge the field of view and determines the position of subset 46 in this enlarged field of view. Then, main sensor 22 is repositioned over sheet-receiving surface 16 such that coordinate region 45 of subset 46 is centered within the field of view of main sensor 22, after which main sensor 22 zooms back in, shrinking its field of view in order to allow precise sensing of the marks of subset 46. Two alternative procedures include zooming main sensor 22 back in either before or during such repositioning; regardless of which procedure is programmed, coordinate region 45 of subset 46 will end up within the shrunken field of view of main sensor 22.

FIG. 5 also can be used to illustrate another embodiment of the reference feature identifier. Main sensor 22 includes a zoom lens 26 which is used to enlarge the field of view of main sensor 22. When reference feature set 49 is not in an expected location, the controller of the reference feature identifier instructs the zoom lens to zoom out to enlarge the field of view and determines the position of set 49 in this enlarged field of view. Then, main sensor 22 is repositioned over sheet-receiving surface 16 such that coordinate region 47 of set 49 is centered within the field of view of main sensor 22, after which main sensor 22 zooms back in, shrinking its field of view in order to allow precise sensing of the metrics of reference feature set 49. Two alternative procedures include zooming main sensor 22 back in either before or during such repositioning; regardless of which procedure is programmed, coordinate region 47 of set 49 will end up within the shrunken field of view of main sensor 22.

Figure 6:
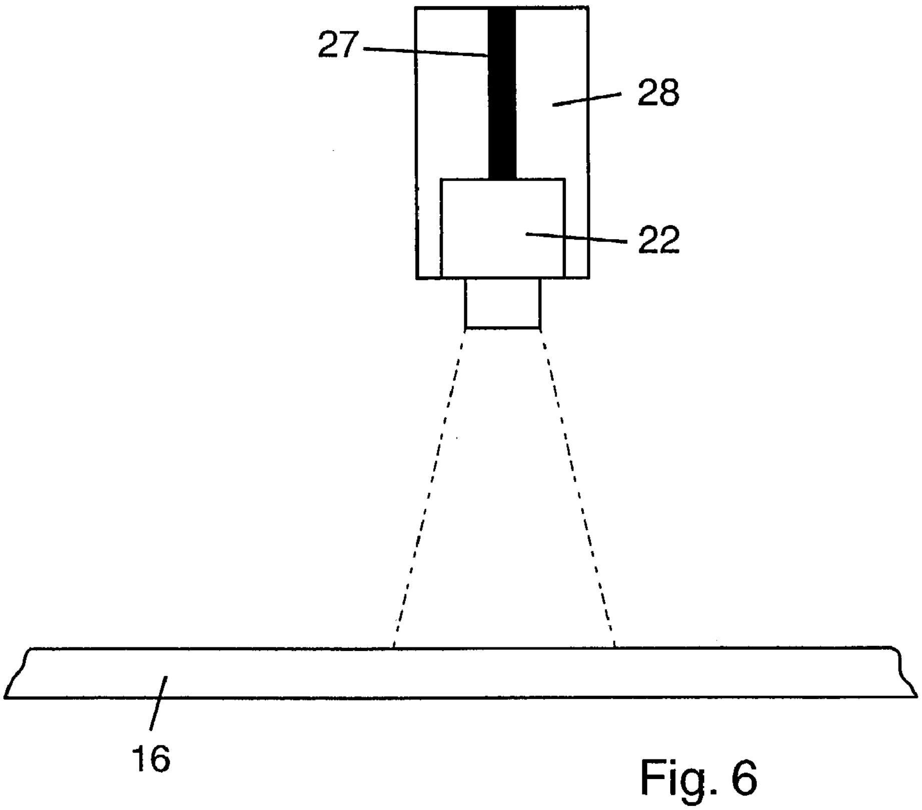
FIG. 6 is a schematic side view of a sheet-receiving surface with a main sensor height adjustor.

FIG. 6 shows schematically yet another embodiment of the coordinate region locator. Main sensor 22 is mounted on main-sensor height adjustor 28. Main sensor 22 is moved along track 27 by a motor (not shown) away from and toward sheet-receiving surface 16 to enlarge and shrink respectively the field of view of main sensor 22. When subset 46 is not in an expected location, the controller of the coordinate region locator instructs main sensor 22 to move away from sheet-receiving surface 16, thereby enlarging the field of view of main sensor 22. The coordinate region locator then determines the position of subset 46 and directs the repositioning of main sensor 22 over sheet-receiving surface 16. Then, main sensor 22 is moved back toward sheet-receiving surface 16 to shrink the field of view, such that coordinate region 45 of subset 46 is within the field of view of main sensor 22.

Figure 4C:
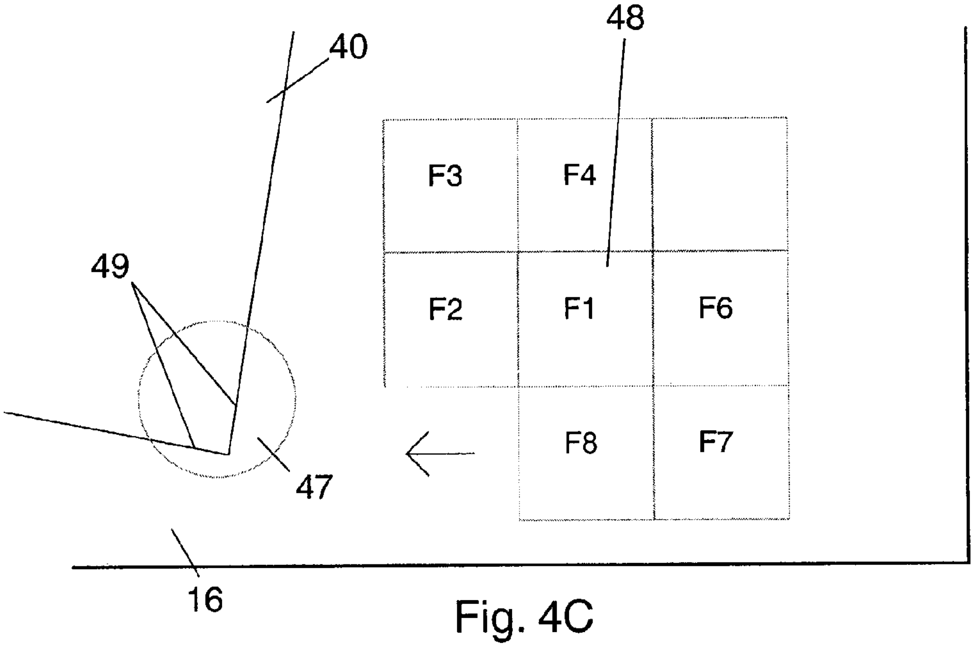
FIG. 4C is a top view of a portion of a sheet-receiving surface, a portion of a sheet of material, and one predetermined pattern of movement of the main sensor, illustrated by consecutive fields of view of the main sensor.
Figure 4D:
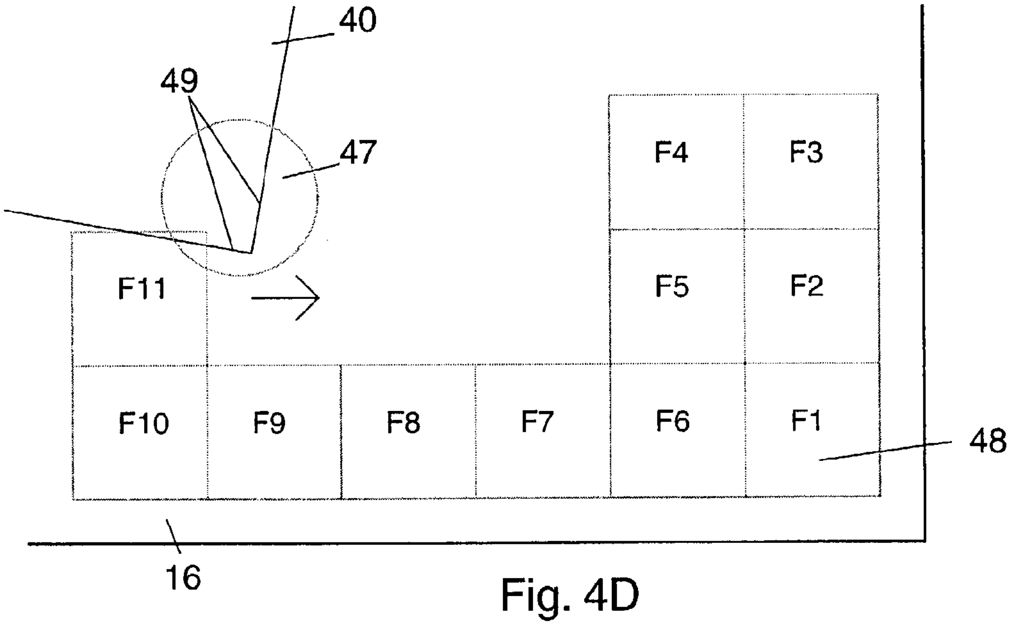
FIG. 4D is a top view of a portion of a sheet-receiving surface, a portion of a sheet of material, and a second predetermined pattern of movement of the main sensor, illustrated by consecutive fields of view of the main sensor.

In a similar fashion to the description of FIG. 5, the physical configuration shown in FIG. 6 also can be used as a portion of a reference feature identifier, with the controller (not shown) containing a set of instructions to instruct height adjustor 28 and to respond to reference feature set 49 (see FIGS. 4C and 4D).

Figure 7:
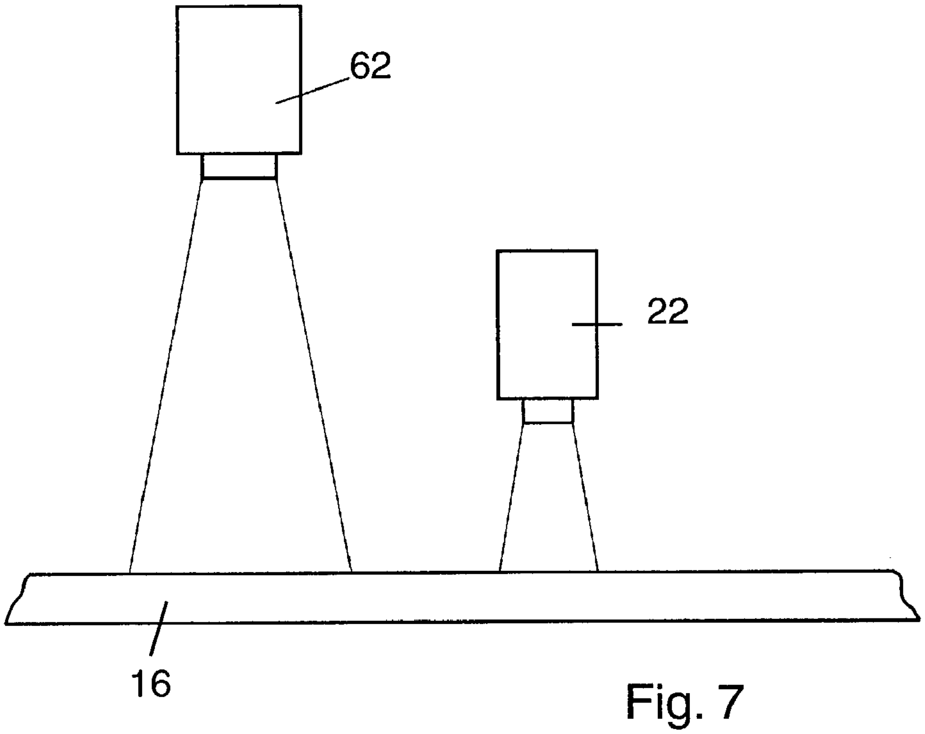
FIG. 7 is a schematic side view of a sheet-receiving surface with a main sensor and a secondary sensor.

FIG. 7 shows schematically a coordinate region locator which includes secondary sensor 62 which has a larger field of view than main sensor 22. Operation of the coordinate region locator in this embodiment is similar to the operation of the embodiment illustrated in FIG. 6, except that secondary sensor 62, the vertical position of which is fixed, takes the place of main sensor 22 in its raised position.

As with the descriptions of FIGS. 5 and 6, the physical configuration shown in FIG. 7 also can be used as a portion of a reference feature identifier, with the controller (not shown) containing a set of instructions to instruct secondary sensor 62 and main sensor 22 and tailored to respond to reference feature set 49 (see FIGS. 4C and 4D).

Figure 8:
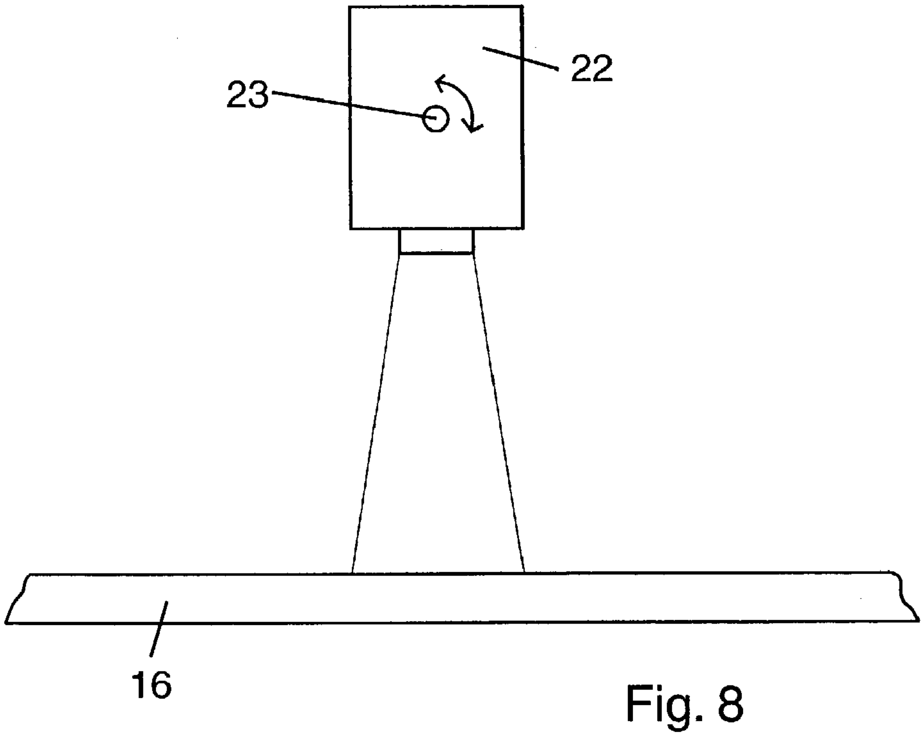
FIG. 8 is a schematic side view of a sheet-receiving surface with a main sensor which rotates to change its field of view.

FIG. 8 illustrates schematically a coordinate region locator which includes rotation around one of two axes parallel to the plane of sheet-receiving surface 16. Rotation about one such axis is illustrated in FIG. 8. When subset 46 is not in an expected location, the controller (not shown) of the coordinate region locator instructs main sensor 22 to rotate in a manner which changes the field of view of main sensor 22, thereby allowing the coordinate region locator to find coordinate region 45 of subset 46 outside of the initial field of view of main sensor 22. Main sensor 22 then determines the position of coordinate region 45 of subset 46, is repositioned over sheet-receiving surface 16, and rotated back to a normal vertical orientation such that coordinate region 45 of subset 46 is within the field of view of main sensor 22.

Again, as with the descriptions of FIGS. 5, 6, and 7, the physical configuration shown in FIG. 8 also can be used as a portion of a reference feature identifier, with the controller (not shown) containing a set of instructions to instruct main sensor 22 to rotate in a manner which changes the field of view of main sensor 22, thereby allowing the reference feature identifier to find coordinate region 47 of set 49 (see FIGS. 4C and 4D) outside of the initial field of view of main sensor 22. Main sensor 22 then determines the position of coordinate region 47 of set 49, is repositioned over sheet-receiving surface 16, and rotated back to a normal vertical orientation such that coordinate region 47 of set 49 is within the field of view of main sensor 22.

Figure 9A:
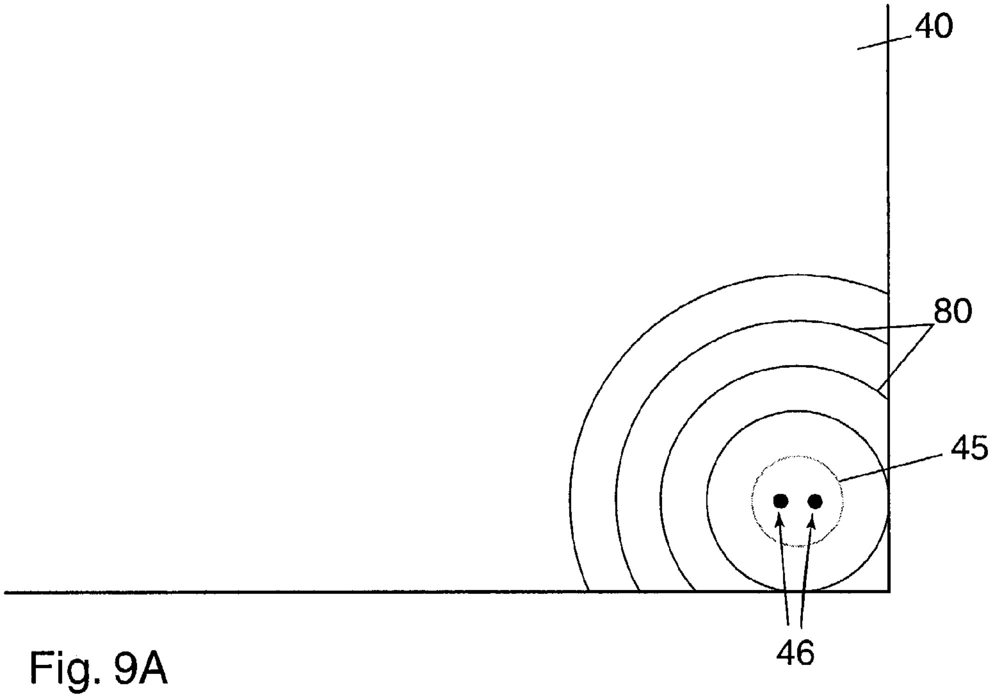
FIG. 9A is a top view of a sheet of material with pre-printed graphics, an initial-position/orientation-determining subset, and one type of directive indicia.
Figure 9B:
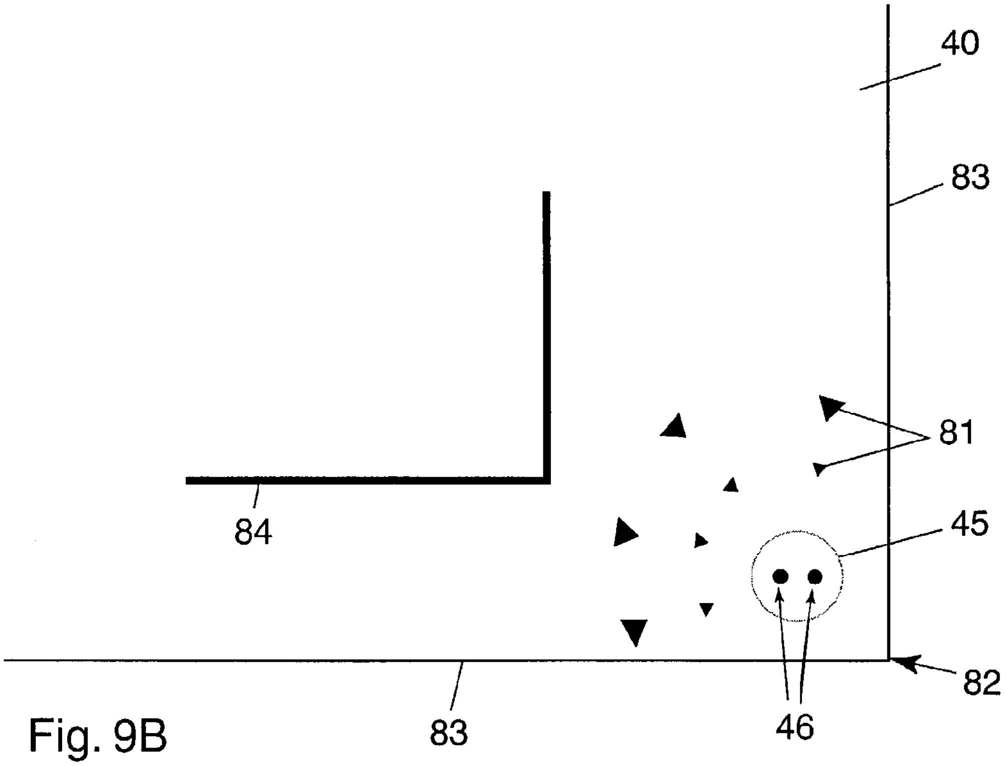
FIG. 9B is a top view of a sheet of material with pre-printed graphics, an initial-position/orientation-determining subset, and two additional types of directive indicia.

FIGS. 9A and 9B illustrate several different types of directive indicia as part of other embodiments of a coordinate region locator. Shown in FIGS. 9A and 9B are corner portions of sheet-receiving surfaces 16 with corner portions of sheet 40 thereon. The corner portions of sheet 40 include subset 46.

FIG. 9A shows circular directive indicia 80 which surround subset 46 such that the coordinate region locator can determine the location of coordinate region 45 of subset 46 when a portion of circular directive indicia 80 is within the field of view of main sensor 22, the curvature and orientation of circular indicia 80 indicating such location. Such circular directive indicia can be continuous as shown, or can be severely discontinuous as necessary to accommodate the graphics. In a similar manner, the size and orientation of arrow directive indicia 81 surrounding subset 46 in FIG. 9B indicate the location of coordinate region 45 of subset 46.

FIG. 9B also illustrates edges 83 of sheet 40, a corner 82 of sheet 40, and graphics image portion 84 which can be used in other embodiments of the coordinate region locator. These three types of directive indicia are but examples of alternative directive indicia which can be used by a coordinate region locator to locate coordinate region 45 of subset 46.

Figure 10A:
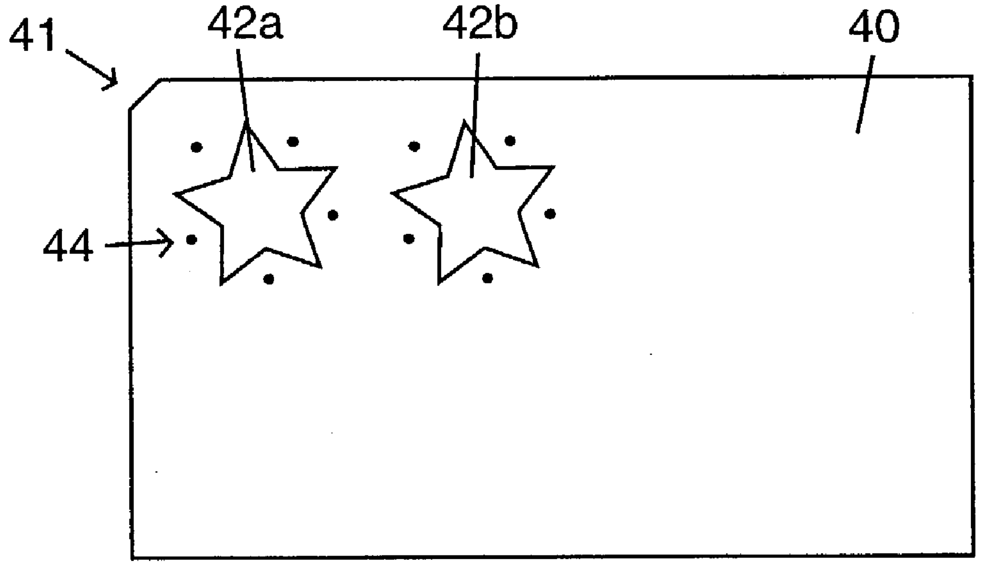
FIG. 10A is a top view of a sheet of material with pre-printed graphics and a set of reference features including a uniqueness feature comprising a corner cut-off.
Figure 10B:
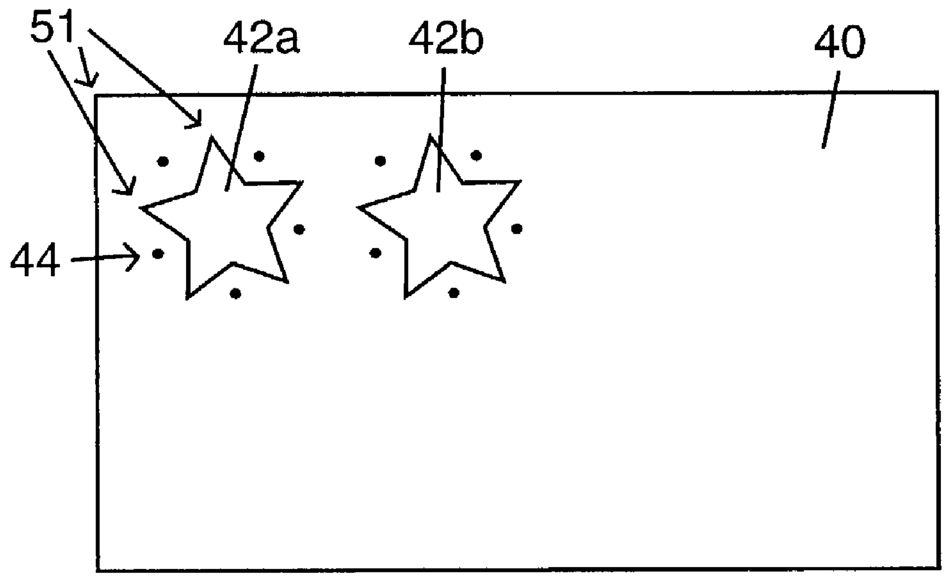
FIG. 10B is a top view of a sheet of material with pre-printed graphics, with a set of reference features including a portion of the graphics image near one corner of the sheet.

FIGS. 10A and 10B illustrate two additional types of reference feature sets (in addition to those illustrated in FIGS. 3B, 4C, and 4D) which can be identified by the reference feature identifier. Shown in FIG. 10A is sheet 40 with graphics 42*a* and 42*b* thereon and reference feature set 41 at the upper left comer of sheet 40. Shown in FIG. 10B is sheet 40 with graphics 42*a* and 42*b* thereon and reference feature set 51 at the upper left comer of sheet 40.

FIG. 10A shows reference feature set 41 as a corner of sheet 40 which has a small section of the corner cut off. One group of metrics of set 41 includes the angle (with respect to the coordinate axes of surface 16, not shown) of the line defined by the edge of the cutoff corner and the two end points of the cutoff corner. If only one corner of sheet 40 has been cut off, then this group of metrics is adequate to uniquely ascertain position and orientation of sheet 40. Another group of metrics can include the angles of the cutoff edge and the two edges which meet the cutoff at its end points (all measured with respect to the coordinate axes of surface 16). In fact, there are numerous combinations of metrics which can be used based on such reference features. Further, if it can be assumed that the initial placement of sheet 40 on surface 16 is such that a particular corner is the corner nearest initial field of view 48 of sensor 22, then a smaller group of metrics is adequate for determining the position and orientation of sheet 40. In this way, the metrics of reference feature set 49 shown in FIGS. 3B, 4C, and 4D can be the angle of the edges of set 49 with respect to a known line of surface 16 or the angle of one edge and the coordinates of the corner point.

FIG. 10B illustrates a different set 51 of reference features comprised of certain features of graphic 42*a* and a corner of sheet 40. The group of metrics can be the coordinates of the three points indicated by the arrows from the number 51, one of which is the corner point itself. Just as in the description of set 41 in FIG. 10A, it will be apparent to those familiar with this invention that other groups of metrics of set 51 can be used to adequately determine the position and orientation of sheet 40 on surface 16.

As indicated above, the method and apparatus of this invention significantly speed the process of locating precise positions of registration marks 44 and improve the efficiency of the overall process, and these advantages are made possible regardless of presence or absence of distortion in sheet 40 occurring after the graphics image and registration marks are printed thereon. In operation, sensor 22 is caused to be positioned over a registration mark 44. Sensor 22 finds the mathematical center of a registration mark 44 and defines its position on work surface 16. Two other registration marks 44 are located and their centers are defined in like manner. These data are inputted to the controller where the actual locations of registration marks 44 on sheet 40 are compared to those of the registration marks in the predetermined processing instructions—which are based on the pre-distortion positions of the graphics image(s) and registration marks 44. The predetermined processing path is adjusted according to the actual (post-distortion) coordinates of registration marks 44. These comparisons are made interactively throughout the cutting process, making the process a dynamic process. The processing path is adjusted according to the actual coordinates of the three registration marks 44 closest to a processing point. When the processing of an individual graphic is completed, cutting tool 20 is caused to be lifted and moved to the next graphic and the process is repeated.

The method and apparatus of this invention have a wide range of applications in a variety of industries. The invention also has application to sheets in the form of curved surfaces, in certain situations. Furthermore, the applicability of the invention is not limited to any particular kind or form of sheet.

Additionally, it should be noted that while two round marks are shown as initial-position/orientation-determining subset of marks 46, numerous other combinations of shapes and sizes of subset marks are sufficient to determine the position and orientation of sheet 40 on work surface 16. For example, with the sensor and controller properly programmed, a single rectangular mark would also provide sufficient information for this determination. In a similar fashion, the reference feature sets described are but a few of the many possible sets can be used in conjunction with a reference feature identifier to uniquely ascertain position and orientation of the sheet of material.

While the principles of this invention have been described in connection with specific embodiments, it should be understood clearly that these descriptions are made only by way of example and are not intended to limit the scope of the invention.

The invention claimed is:

1. A method for automatically preparing at least one graphic on a sheet of material, the method comprising:

applying to the sheet of material the graphic in a position according to layout data;

applying a plurality of registration marks to the sheet of material at and about the graphic in predetermined positions with respect thereto at the time the graphic is applied according to layout data, the plurality of registration marks including an initial-position/orientation-determining subset located on no more than one side of the graphic;

transferring the layout data to a processing controller;

placing the sheet of material on a sheet-receiving surface;

sensing the subset to ascertain a position and orientation of the sheet of material and approximate positions of the plurality of registration marks thereon;

sensing precise positions of the registration marks on the sheet of material; and utilizing the layout data and the precise positions of the registration marks with respect to the graphic to precisely narrow-path-process around the graphic on the sheet of material.

2. The method of claim 1 comprising the additional steps of retaining the sheet of material on the sheet-receiving surface at a location thereon such the sheet of material overlaps the X and Y coordinate grid, acquiring X and Y coordinates which are overlapped by the registration marks and comparing the X and Y coordinates which are overlapped by the registration marks with a reference set of X and Y coordinates.

3. The method of claim 2 wherein the layout data includes reference X and Y coordinates for the registration marks and the predetermined positions thereof with respect to the perimeter of the graphic when the graphic and registration marks are applied to the sheet of material, and wherein the utilizing step further includes setting an optimized processing path based on the comparing step, such optimized processing path corresponding to the perimeter of the graphic.

4. The method of claim 1 wherein at least one of the registration marks is multiple lines applied to the sheet of material along an edge thereof.

5. The method of claim 1 wherein at least one of the registration marks is multiple marks applied to the sheet of material along an edge thereof.

6. The method of claim 1 wherein at least one of the registration marks is a bar code, the method further including the steps of:

reading the bar code to identify the sheet of material on the sheet-receiving surface; and finding the layout data corresponding to the graphic and registration mark applied to the sheet of material.

7. The method of claim 1 wherein the layout data is transferred to the processing controller through a network connection.

8. The method of claim 1 wherein the layout data is transferred to the processing controlier by downloading the layout data to a disc and uploading the layout data from the disc to the processing controller.

9. The method of claim 1 wherein the layout data comprises graphic data and registration mark data and the transferring step comprises:

transferring the graphic data and registration mark data to at least one file;

transferring the at least one file to the processing controller; and uploading the graphic data and registration mark data from the file to the processing controller.

10. The method of claim 9 wherein the registration mark data comprises data pertaining to X-Y position, angle orientation and scale factor.

11. The method of claim 1 wherein the applying step includes providing at least one registration mark within the graphic.

12. A method for automatically preparing at least one graphic on a sheet of material, the method comprising:

applying to the sheet of material the graphic and at least one registration mark in positions according to layout data;

transferring the layout data to a processing controller;

placing the sheet of material on a sheet-receiving surface, automatically sensing the position of the registration mark on the sheet of material in a field of view of a main sensor and utilizing the layout data to determine the position and orientation of the sheet of material;

if the registration mark is not in an expected location, automatically determining a coordinate region of the registration mark on the sheet-receiving surface by enlarging the field of view of the main sensor and locating the coordinate region of the registration mark within the enlarged field of view;

in response to determining the coordinate region of the registration mark, automatically repositioning the main sensor to the coordinate region by shrinking the field of view of the main sensor such that the registration mark is within the field of view of the main sensor; and utilizing the layout data and the position of the registration mark to precisely narrow-path-process around the graphic on the sheet of material.

13. The method of claim 12 wherein the sensing step includes moving a sensor operatively connected to the sheet-receiving surface along the suffice to detect the position of the registration mark and the utilizing step includes communicating the position of the registration mark from the sensor to the processing controller.

14. A method for automatically preparing at least one graphic on a sheet of material, the method comprising:

applying to the sheet of material the graphic in a position thereon according to layout data, the layout data including a predetermined approximate position and orientation of the graphic with respect to a set of reference features of the sheet of material;

transferring the layout data to a processing controller;

placing the sheet of material on a sheet-receiving surface;

automatically determining whether the reference features are in an expected coordinate region on the sheet-receiving surface;

if the reference features of the sheet of material are not in the expected coordinate region, automatically determining the coordinate region of the reference features on the sheet-receiving surface;

sensing metrics of the reference features to determine a position and orientation of the sheet of material;

inferring therefrom the approximate position of the graphic; and utilizing the layout data and precise position of the graphic to precisely narrow-path-process around the graphic on the sheet of material.

15. The method of claim 14 wherein the layout data is transferred to the processing controller through a network connection.

16. The method of claim 14 wherein the layout data is transferred to the processing controller by downloading the layout data to a disc and uploading the layout data from the disc to the processing controller.

* * * * *